Nov. 3, 1970  R. L. BENNETT  3,537,242
FLUID FLOW FRAME RETAINER
Filed Feb. 17, 1969
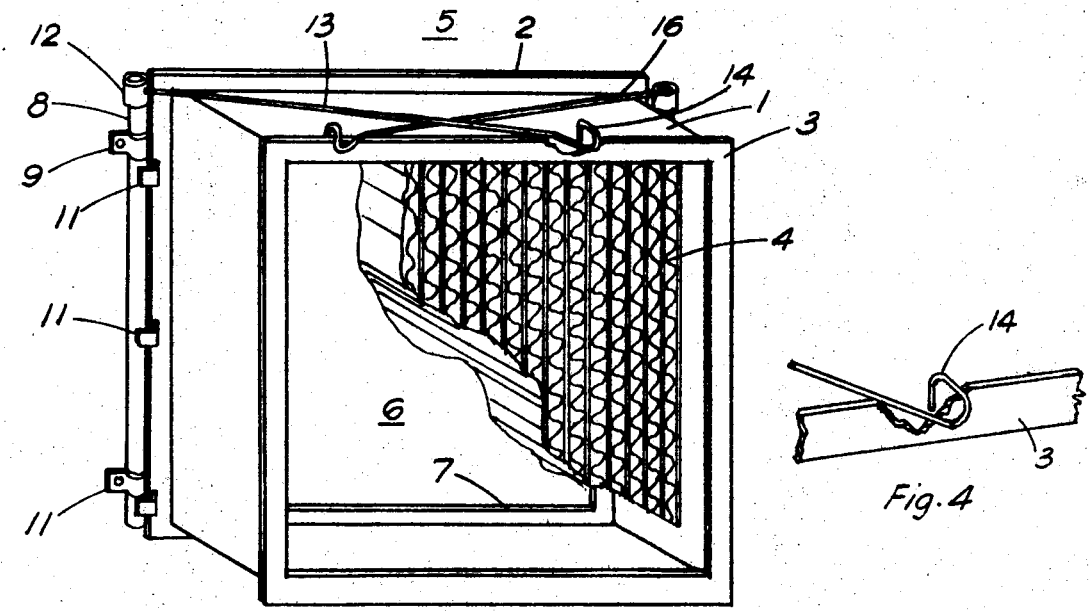
Fig. 1
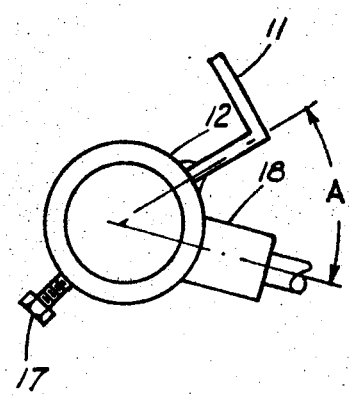
Fig. 4
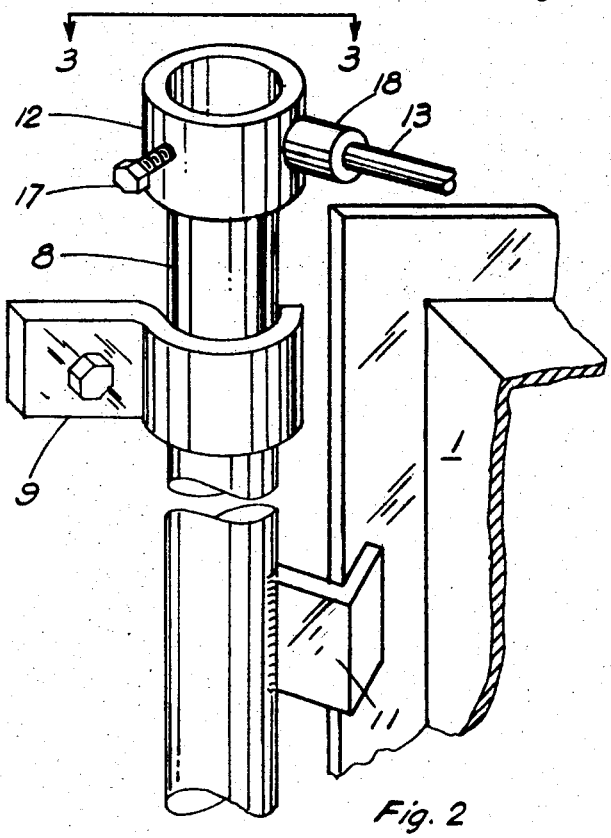
Fig. 2
Fig. 3
INVENTOR.
Robert L. Bennett
BY Edward M. Steutermann
ATTORNEY

United States Patent Office 3,537,242
Patented Nov. 3, 1970

3,537,242
FLUID FLOW FRAME RETAINER
Robert L. Bennett, Louisville, Ky., assignor to American Air Filter Company, Inc., Louisville, Ky., a corporation of Delaware
Filed Feb. 17, 1969, Ser. No. 799,658
Int. Cl. B01d 27/08
U.S. Cl. 55—493
4 Claims

ABSTRACT OF THE DISCLOSURE

An assembly to fasten a fluid flow frame to a selected wall member which includes a shaft, to be rotatably secured to the wall member, with bracket means extending radially therefrom which are adapted to engage a peripheral flange of the frame and hold the flange against the wall member. Handle means are provided to rotate the shaft so the bracket means engage the flange means of the frame and are adapted to be secured to the frame to hold the bracket means against the peripheral edge.

BACKGROUND OF THE INVENTION

In various applications it is desirable to secure a frame member, which can be adapted to contain a fluid filtering media, in selected communicative relation with an aperture in a wall member.

In previous arrangements separate, individually operable, latch means have been provided to secure different segments of the frame means to the wall member. The individual latches are expensive and in such arrangements the force exerted by the different latch members may not be uniform so the frame member is subjected to a twisting effect which can result in undesirable fluid leakage between the wall member and the edge of the fluid flow frame.

Furthermore, in arrangements where a multiplicity of latches are used, considerable time is consumed in removing and replacing frame members.

SUMMARY OF THE INVENTION

It is recognized that in accordance with the present invention a straightforward, economical filter latch arrangement is provided so a substantially uniform force is exerted against a cooperative peripheral flange of a fluid flow frame member to secure the frame member to a cooperative wall member having an aperture in communicative relation with the frame. Moreover, the present invention provides clamping devices which are quickly opened and closed to facilitate removal and replacement of fluid flow frames to exert a uniform force along a selected segment of the flange of the filter frame to avoid undesirably twisting the frame, and to substantially diminsh the probability of fluid leakage between the wall member and the frame member.

Various other features of the present invention will become obvious to those skilled in the art upon reading the disclosure set forth hereinafter.

More particularly, the present invention provides a latch means to fasten a fluid flow frame having a fluid inlet opening, a fluid outlet opening, and an outwardly extending peripheral flange adjacent one such opening, to a wall member having a cooperative aperture comprising: a shaft member rotatably secured to the wall member in selected spaced relation from the aperture; bracket means extending radially outwardly from the rotatable shaft member; arm means extending radially outwardly from the shaft member; means to secure the arm means to the frame member when the arm has been rotated to a position pressing the bracket members against the peripheral flange to urge the frame in sealing relation against the wall member.

It is to be understood that the example of one arrangement in accordance with the present invention given hereinafter is not by way of limitation and that various changes can be made in the arrangement, form, or configuration of the apparatus disclosed without departing from the scope or spirit of the present invention.

Referring now to the figures:

FIG. 1 is an illustration of one example of one filter clamping arrangement in accordance with the present invention;

FIG. 2 is an enlarged view of a portion of a clamping device in accordance with the present invention;

FIG. 3 is a view taken along a plane passing through line 3—3 of FIG. 2 and,

FIG. 4 is an enlarged partially broken away view of the hook of the clamping device in engagement with the flange of a filter.

The clamping device in accordance with the present invention as shown in the example of FIG. 1 provides a means for clamping a fluid flow frame 1 to a wall member 5. Wall 5 has an aperture 6 defined by one edge 7 and frame 1 is advantageously secured to wall 5 in communicative relation with aperture 6 as hereinafter described.

Frame 1 includes outwardly extending peripheral flange 2 adjacent one edge of the frame member, for example the fluid outlet and a second outwardly extending peripheral flange 3 surrounding the second opening in the frame member, for example a fluid inlet. Frame 1 can be adapted to receive a selected filter media 4 which can be disposed across the fluid flow conduit formed by the frame member to remove selected materials from the fluid, for example air, flowing through the frame member.

As shown, a clamping arrangement including a shaft 8 rotatably secured to wall 5 in selected position with respect to aperture 6 by means of brackets 9 can be provided to fasten frame 1 to wall 5.

Referring now to FIG. 2, shaft 8 includes bracket means, for example L-shaped lugs 11 extending radially outwardly from shaft 8, to engage peripheral flange 2 and to urge frame 1 against wall 5 when shaft 8 is rotated to a selected position. Considering FIG. 1, it will be noted that rotatable shaft 8 includes several, for example three, lug members 11 which are in generally aligned relation along the logitnudinal axis of shaft 8.

Again referring to FIG. 2, a sleeve member 12, including a set screw 17, is provided adjacent one end of shaft 8 and carries a second sleeve 18 extending radially therefrom. A handle 13 is provided to be inserted into sleeve 18 to rotate shaft 8 so lugs 11 are urged against peripheral flange 2 as hereinbefore described. Handle 13 includes a hook 14 designed to engage the inner surface of peripheral flange 3 to retain the handle in a position so lugs 11 exert a selected force on flange 2.

In the example of the figures, a rotatable shaft 8 with lugs 11 as hereinbefore described, is provided to engage flange 2 adjacent opposite sides of frame 1 and it is to be understood that within the scope of the present invention additional clamping members can be provided for other edges of the frame member.

In operation, a selected frame 1 is placed in position against wall 5 to cover aperture 6 and handle member 13 is moved to rotate shaft 8 so lugs 11 engage peripheral flange 2 and urge flange 2 to sealing relation with wall member 5. Additional sealing means, for example a rubber strip (not shown) can be provided between the peripheral flange 2 and wall member 5. The force exerted by lugs 11 on flange 2 to provide the seal is determined by the length of arm 13, and the angle A between sleeve 18 and lug 11 as shown in FIG. 3. The angle can be selectively adjusted by loosening set screw 17 and changing the position of sleeve 12 on shaft 8 and it will be understood that the greater the angle between the axis in FIG. 3, the greater the force exerted on flange 2.

The invention claimed is:

1. A latch arrangement to fasten a filter frame having a fluid inlet opening, a fluid outlet opening, and an outwardly extending flange means adjacent one opening to a wall member having a cooperative aperture comprising: a shaft member rotatably secured to said wall member in selected spaced relation from said aperture on one side thereof; bracket means extending radially outwardly from said rotatable shaft member; arm means extending radially outwardly from said shaft member, the extremity of said arm means being spaced from said bracket means; means on said arm means to secure said arm means to said frame when said shaft member has been rotated to a position pressing the bracket means against said flange means and to urge said frame means to sealing relation against said wall member.

2. The arrangement of claim 1 including filter media disposed within said frame to remove particulate matter from a fluid stream flowing through said frame.

3. The apparatus of claim 1 wherein said shaft member includes an adjustable sleeve member adapted to receive said arm means whereby the angular position of said arm means, relative to said bracket means, can be selectively adjusted.

4. The assembly of claim 3 including first peripheral flange means extending outwardly around a portion of said outlet opening and second peripheral flange means extending outwardly around a portion of said inlet opening and wherein said arm means includes hook means to engage said second flange means when said bracket means are in position engaging said first flange means to urge said frame to sealing relation with said wall member.

References Cited

UNITED STATES PATENTS 3,093,401   6/1963   Hagendoorn _____ 55—493
3,366,433   1/1968   Cann _____ 292—218

FRANK W. LUTTER, Primary Examiner

B. NOZICK, Assistant Examiner

U.S. Cl. X.R.

55—496; 292—218